(12) United States Patent
Tofte et al.

(10) Patent No.: US 11,808,856 B1
(45) Date of Patent: Nov. 7, 2023

(54) ROBUST LASER SCANNING FOR GENERATING A 3D MODEL

(71) Applicant: STATE FARM MUTUAL AUTOMOBILE INSURANCE COMPANY, Bloomington, IL (US)

(72) Inventors: Nathan L. Tofte, Downs, IL (US); Patrick H. Boyer, Bloomington, IL (US); James M. Freeman, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 741 days.

(21) Appl. No.: 16/852,731

(22) Filed: Apr. 20, 2020

Related U.S. Application Data

(63) Continuation of application No. 15/598,071, filed on May 17, 2017, now Pat. No. 10,663,591.

(51) Int. Cl.
| | |
|---|---|
| *G01S 17/89* | (2020.01) |
| *G01S 7/481* | (2006.01) |
| *G01S 7/48* | (2006.01) |
| *G01S 7/497* | (2006.01) |
| *G01S 17/88* | (2006.01) |
| *G01S 17/66* | (2006.01) |
| *G01S 7/00* | (2006.01) |

(Continued)

(52) U.S. Cl.
CPC .............. *G01S 17/89* (2013.01); *G01S 7/003* (2013.01); *G01S 7/4808* (2013.01); *G01S 7/4817* (2013.01); *G01S 7/4972* (2013.01); *G01S 17/10* (2013.01); *G01S 17/42* (2013.01); *G01S 17/66* (2013.01); *G01S 17/88* (2013.01);

*B64U 2101/00* (2023.01); *B64U 2101/30* (2023.01)

(58) Field of Classification Search
None
See application file for complete search history.

(56) References Cited

U.S. PATENT DOCUMENTS

| | | |
|---|---|---|
| 10,311,302 B2 | 6/2019 | Kottenstette et al. |
| 10,366,288 B1 | 7/2019 | Kottenstette et al. |
| 10,643,072 B2 | 5/2020 | Kottenstette et al. |
| 11,151,378 B2 | 10/2021 | Kottenstette et al. |
| 11,210,552 B2 | 12/2021 | Kossyk et al. |
| 11,222,426 B2 | 1/2022 | Richter et al. |

(Continued)

OTHER PUBLICATIONS

"3D Scanning 101 -Desktop Engineering," http://www.deskeng.com/de/3d-scanning-101, retrieved on Dec. 25, 2015.

(Continued)

*Primary Examiner* — Luke D Ratcliffe
(74) *Attorney, Agent, or Firm* — MARSHALL, GERSTEIN & BORUN LLP (57) ABSTRACT

In a method and system for scanning a structure, a structure scanner may acquire multiple scans of a surface of a structure. Each of the scans may correspond to different portions of the surface. The property inspection system may generate a 3D model of the surface using the scans. To account for potential changes in position and/or orientation of the structure scanner between scans, the structure scanner may self-calibrate using a fiducial marker. By correcting for changes in position and orientation over time, the structure scanner may accurately map the scans of the different portions of the surface to a 3D model of the surface.

16 Claims, 8 Drawing Sheets

(51) Int. Cl.
  *G01S 17/42*  (2006.01)
  *G01S 17/10*  (2020.01)
  *B64U 101/00*  (2023.01)
  *B64U 101/30*  (2023.01)

(56) References Cited

U.S. PATENT DOCUMENTS

| | | |
|---|---|---|
| 11,232,150 B2 | 1/2022 | Vianello et al. |
| 11,367,265 B2 | 6/2022 | Vianello et al. |
| 2009/0268214 A1 | 10/2009 | Lucic et al. |
| 2010/0079974 A1 | 4/2010 | Kruger et al. |
| 2013/0249907 A1* | 9/2013 | Humphries et al. . G06T 7/0012 345/420 |
| 2014/0368378 A1* | 12/2014 | Crain et al. ............ G01S 13/88 342/25 A |
| 2018/0176483 A1* | 6/2018 | Knorr et al. ......... G06T 19/006 |

OTHER PUBLICATIONS

"Low-cost 3d Laser Scanner and fast Surface Registration," http://www.rob.cs.tubs.de/en/news/david, retrieved Dec. 25, 2015.

\* cited by examiner

ROBUST LASER SCANNING FOR GENERATING A 3D MODEL

CROSS-REFEERENCE TO RELATED APPLICATION

This application is a continuation of U.S. Application Serial No. 15/598,071, which was filed on May 17, 2017, and is titled "ROBUST LASER SCANNING FOR GENERATING A 3D MODEL," the entire disclosure of which is expressly incorporated herein by reference.

TECHNICAL FIELD

This disclosure relates to property inspection methods and systems, and in particular, to property inspection systems and methods for inspecting the condition of the structure using a structure scanner and a fiducial marker.

BACKGROUND

After an accident or loss, property owners typically need to document the extent of the damage. To do this, appraisers investigate the damage to determine the extent and/or loss. Determining and documenting the extent of damage can be risky for the appraiser. For example, in a situation where a structure experiences roof damage, appraisers typically climb onto the roof to evaluate the damage. When climbing onto the roof and maneuvering around the roof for the inspection, an appraiser runs the risk of injury, especially in difficult weather conditions, where the roof may be slippery because of severe winds, rain, snow and/or ice.

Even if the appraiser is not injured, the appraisal process is time-consuming and inefficient. Once on the roof, appraisers may take a digital picture of the damaged area. Afterwards the picture is typically analyzed later by an appraiser to estimate the extent of damage to the structure. Two-dimensional digital pictures or videos of a roof or structure often provide inadequate detail for a thorough inspection of the structure. Issues like poor image quality resulting from camera movement, bad lighting or out-of-focus images can make it difficult to estimate the condition of the property based on an image.

SUMMARY

A system and method of scanning a structure is disclosed. In one example of the present disclosure, a property inspection system for scanning a structure with one or more structure scanners comprises a fiducial marker with a known size and shape at a known location on the surface of the structure and one or more structure scanners. The structure scanners comprise a display device coupled to the structure scanner, a laser tracking device, coupled to the structure scanner, having a transmitter, a timer and a receiver, a laser scanning device, coupled to the structure scanner, having a transmitter, a timer and a receiver, at least one processor communicably coupled to the at least one laser tracking device and the at least one laser scanning device and at least one memory communicably coupled to the at least one processor. The at least one memory includes computer-executable instructions stored therein that, when executed by the at least one processor, cause the at least one processor to: (A) scan the fiducial marker a first time with the laser tracking device to (i) obtain a first 3D representation of the fiducial marker, and (ii) determine a first orientation and position of the structure scanner based on the first 3D representation of the fiducial marker; (B) scan a first portion of the surface of the structure with the laser scanning system to obtain a 3D representation of the first portion of surface of the structure; (C) map the 3D representation of the first portion of the surface of the structure to the 3D model of the structure based on the determined first orientation and position of the structure scanner; (D) scan the fiducial marker a second time with the laser tracking device to (i) obtain a second 3D representation of the fiducial marker and (ii) determine a second orientation and position of the structure scanner relative to the first orientation and position of the structure scanner based on the second 3D representation of the fiducial marker; (E) scan a second portion of the surface of the structure with the laser scanning system to obtain a 3D representation of the second portion of the surface of the structure; (F) map the 3D representation of the second portion of the surface of the structure to the 3D model of the structure based on the determined second orientation and position of the structure scanner; (G) generate an estimation of the condition of the structure based on the 3D model of the structure; and (H) display, at the display device, the estimation of the condition of the structure.

In another example, the method of scanning a structure includes deploying a fiducial marker on a structure and generating, by a structure scanner, a 3D model of the structure. The structure scanner generates the 3D model of the structure by: (A) scanning the fiducial marker a first time with a laser tracking device coupled to the structure scanner to (i) obtain a first 3D representation of the fiducial marker, and (ii) determine a first orientation and position of the structure scanner based on the first 3D representation of the fiducial marker; (B) scanning a first portion of the surface of the structure with a laser scanning system coupled to the structure scanner to obtain a 3D representation of the first portion of surface of the structure; (C) mapping the 3D representation of the first portion of the surface of the structure to the 3D model of the structure based on the determined first orientation and position of the structure scanner; (D) scanning the fiducial marker a second time with the laser tracking device coupled to the structure scanner to (i) obtain a second 3D representation of the fiducial marker and (ii) determine a second orientation and position of the structure scanner relative to the first orientation and position of the structure scanner based on the second 3D representation of the fiducial marker; (E) scanning a second portion of the surface of the structure with the laser scanning system to obtain a 3D representation of the second portion of the surface of the structure; and (F) mapping the 3D representation of the second portion of the surface of the structure to the 3D model of the structure based on the determined second orientation and position of the structure scanner. Once the 3D model is generated, the method continues with generating, by the structure scanner, an estimation of the condition of the structure based on the 3D model of the structure; and displaying, at a display device coupled to the structure scanner, the estimation of the condition of the structure.

BRIEF DESCRIPTION OF THE DRAWINGS

The figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown, in the drawings, arrangements which are presently discussed. It is understood, however, that the present examples are not limited to the precise arrangements and instrumentalities shown, wherein.

DETAILED DESCRIPTION

Figure 1:
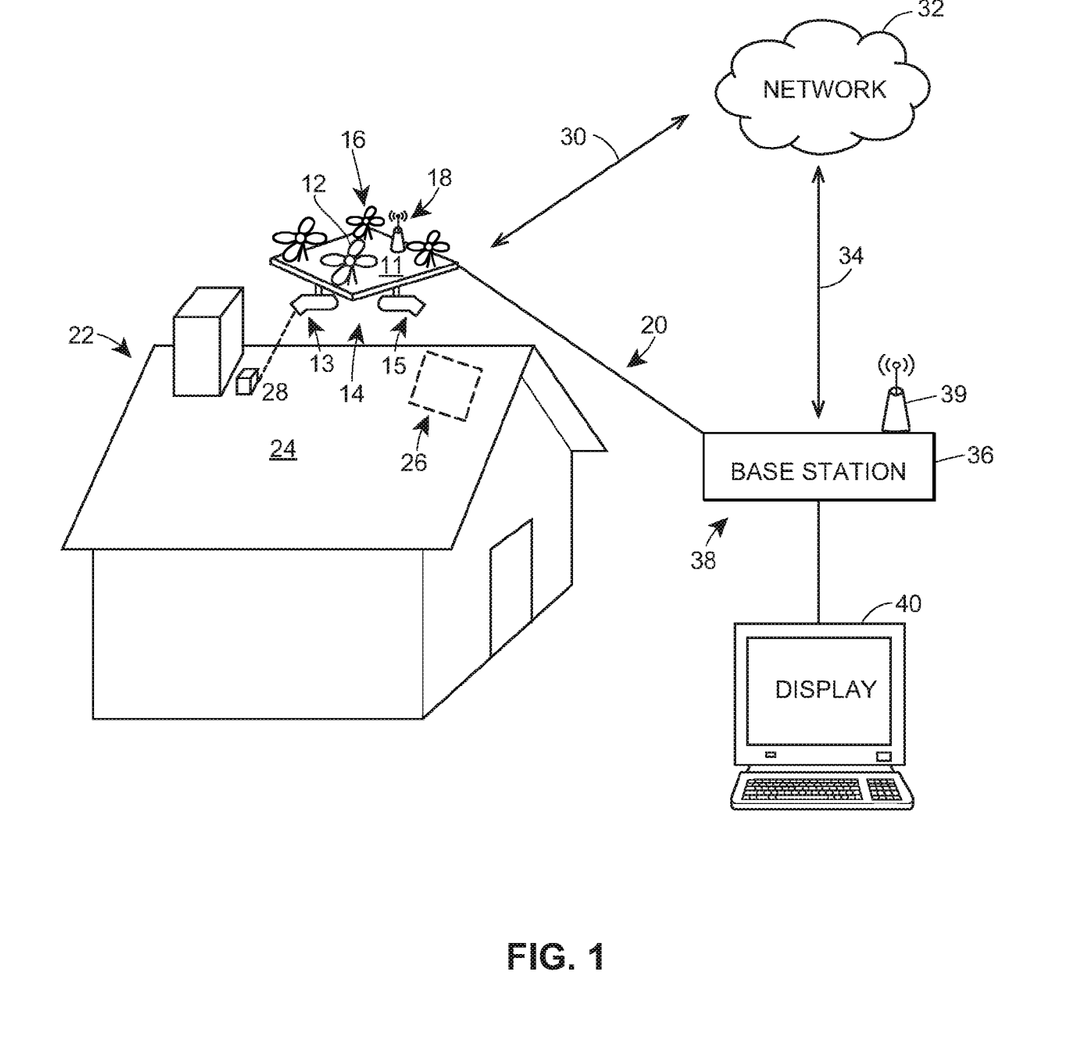
FIG. 1 is a perspective view of a property inspection system according to one example of the present disclosure.

FIG. 1 depicts a property inspection system 10 according to an embodiment. The property inspection system 10 includes a structure scanner 12, which may be configured to scan a surface 24 of a structure 22. The property inspection system 10 may generate a 3D model of the surface 24 based on one or more scans obtained by the structure scanner 12 and may generate an estimate regarding the condition of the structure 22 based on an analysis of the generated 3D model.

The structure scanner 12 may rely on laser scanning to obtain the scans utilized to generate the 3D model. In example operation, the structure scanner 12 scans a first portion of the surface 24. The structure scanner 12 may estimate the real-world position of the first portion. For example, the structure scanner 12 may determine its own real-world position and orientation (e.g., utilizing an on-board global-positioning system). The structure scanner 12 may then rely on a ranging technique (e.g., utilizing a laser) to determine: (i) a distance between the scanner 12 and the surface 24, and/or (ii) a horizontal angle and/or vertical angle of a line from the structure scanner 12 to the surface 24 (e.g., relative to a vertical and/or horizontal plane for the structure scanner 12). Based on the distance and/or angles, the structure scanner 12 may estimate a real-world position of the first portion. The scan of the first portion can then be mapped to a 3D model in a 3D space corresponding to the real-world space.

The structure scanner 12 may repeat this process to scan a second portion of the surface 24, a third portion of the surface 24, etc. Unfortunately, due to a number of factors (e.g., real-world environmental factors such as wind), the position and/or orientation of the structure scanner 12 may change over time. For example, the structure scanner 12 may slightly drift up, down, left, or right; it may be tilted at a slightly different angle relative to the first scan; etc. This deviation in position and/or orientation can result in the structure scanner 12 estimating an incorrect real-world position of the scanned second portion because the structure scanner 12 may rely on a faulty assumption regarding its real world position. In other words, the spatial relationship between the structure scanner 12 and the surface 24 may change from the first scan to the second scan, but the structure scanner 12 may continue operating under the assumption that the relationship has not changed. Thus, the structure scanner 12 may estimate a real-world position of the second portion that is "off" relative to the estimated real-world position of the first portion. As a result, when the property inspection system 10 maps the second scan to the 3D model, the relationship between the modeled first and second portion may not correlate to the real-world relationship between the first and second portion. Because a 3D model may be built from hundreds or thousands of scans, deviations in scanner position and/or orientation can result in a 3D model that looks nothing like the originally scanned structure.

To address this problem with deviations in position and/or orientation of the structure scanner 12, the structure scanner 12 may be configured to self-calibrate in a continuous manner. The structure scanner 12 may self-calibrate by tracking a fiducial marker 28 to determine a spatial orientation and/or position of the structure scanner 12 relative to the surface 24 for each of a plurality of scans, enabling the structure scanner 12 to scan multiple sections of the surface 24 over time while correcting for changes in position and orientation. By correcting for changes in position and orientation over time, the structure scanner 12 can accurately map the scans of the multiple portions to a 3D model of the surface 24.

The structure scanner 12 may include a base 11, an antenna 18, at least one sensing system 14 (which may be coupled to the base 11 of the structure scanner 12) and/or a flying device 16. The sensing system 14 may include a laser tracking device 13 and/or a laser scanning device 15. Each of the laser scanning device 15 and the laser tracking device 13 may be a part of the structure scanner 12, or may be a standalone device that is communicably coupled to the structure scanner 12, depending on the embodiment.

The structure scanner 12 may be disposed above a structure 22 above a plurality of points in an area 26 of a surface 24 of the structure 22 and above the fiducial marker 28 on the surface 24 of the structure 22. The fiducial marker 28 may be placed on the surface 24 of the structure 22 by either a user (e.g., an insurance agent or claim adjuster), or may be placed there by the property inspection system 10 itself. Once a scan is complete, the fiducial marker 28 may be recovered by either a user or the property inspection system 10 itself, or may be left behind to be disposed by natural processes (e.g., dissolved by rain). As discussed in further detail below, the fiducial marker 28 may be either three-dimensional or two-dimensional, depending on the accuracy required for the scan.

The flying device 16 may position the structure scanner 12 above the surface 24 of the structure 22 in order to perform a scan. In FIG. 1, the flying device 16 is depicted as a quadcopter, however the flying device 16 may alternatively be a helicopter, airplane, projectile, rocket, drone, or any other device capable of flight, levitation or gliding, depending on the embodiment. In an embodiment, the structure scanner 12 may be held and operated by a person (not shown).

The property inspection system 10 may include a data analysis system 38. The data analysis system 38 may include a base station 36, a display 40, and/or an antenna 39, which may be in communication with the antenna 18 of the structure scanner 12, as explained below. As depicted in FIG. 1, the structure scanner 12 may be tethered by a tether line 20 to the base station 36 of the data analysis system 38. In some examples, the tether 20 may provide power to the flying device 16. The tether 20 may also provide a communication channel between the structure scanner 12 and the base station 36 (and may replace antennas in certain examples).

Alternatively or additionally, the data analysis system 38 may be in communication with the structure scanner 12 via a network 32 and one or more communication links 30 and 40 (each of which may be wired or wireless in nature). As one of ordinary skill in the art will appreciate, the network 32 may be a single network, or may include multiple networks of one or more types (e.g., a public switched telephone network (PSTN), a cellular telephone network, a wireless local area network (WLAN), the Internet, etc.). In some examples, the network 32 may include one or more devices such as computers, servers, routers, modems, switches, hubs, or any other networking equipment, and one or more wired and/or wireless communication links.

In addition, while the structure 22 is depicted in FIG. 1 as a building (e.g., which may be residential, commercial, industrial, agricultural, or educational in nature) the structure 22 may be any type of construction or object and still fall within the scope of the present disclosure. For example, the structure 22 may alternatively be personal property, such as a vehicle, boat, aircraft, or furniture.

The property inspection system 10 may be utilized in a number of situations. In one example, a user associated with an insurance company utilizes the property inspection system 10 for the purpose of inspecting the condition of the structure 22. In another example, the property inspection system 10 is used for the purpose of estimating the commission of a structure 22 based on the information detected about the surface 24 of the structure 22 during the inspection.

Figure 2:
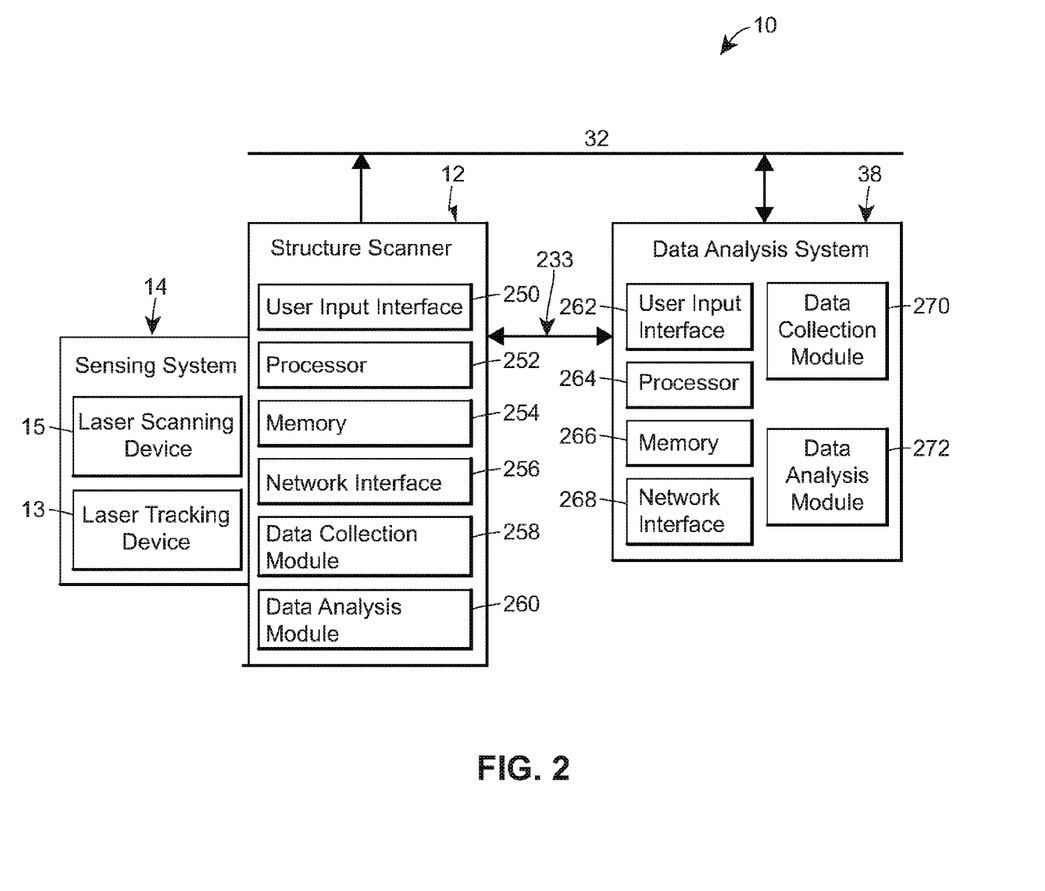
FIG. 2 is a block diagram of the property inspection system of FIG. 1.

Referring now to FIG. 2, a block diagram of the inspection system 10 of FIG. 1 is depicted. As noted with reference to FIG. 1, the property inspection system 10 includes the structure scanner 12, which is communicatively coupled to the data analysis system 38 via the network 32. In some instances, the structure scanner 12 may be coupled to the data analysis system 38 via a wired connection 233.

As shown, the structure scanner 12 includes a user input interface 250, at least one processor 252, a memory 254 coupled to the processor 252, and/or a network interface 256. The structure scanner 12 may also include a data collection module 258 and/or a data analysis module 260, each of which may be an application or set of instructions in certain embodiments and may be stored to the memory 254.

In an embodiment, the data analysis system 38 may include a user input interface 262, at least one processor 264, at least one memory 266 coupled to the processor 264, and/or a network interface 268. The data analysis system 38 may also include a data collection module 270 and/or a data analysis module 272, each of which may be an application or set of instructions in certain embodiments and may be stored to the memory 266.

In certain examples, the memory 254 of the structure scanner 12 and the memory 266 of the data analysis system 38 may include volatile and/or non-volatile memory and may be removable or non-removable memory. For example, the memories 254 and 266 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. In addition, the network interfaces 256 and 268 each may include an antenna, a port for wired connection, or both.

In example operation of the property inspection system 10, the data collection module 258 may cause the structure scanner 12 to generate data representing information detected by the laser scanning device 15 and/or the laser tracking device 13. The data collection module 258 may then cause the scanner 12 to transmit the generated data over the network 32 to the data analysis system 38. The data analysis module 272 may then cause the system 38 to estimate the condition of the structure 22 by analyzing the generated data.

In some examples, estimating the condition of the structure 22 may include comparing the generated data to reference data stored in the memory 254 of the structure scanner 12 and/or in the memory 266 of the data analysis system 38. The reference data may be any type of data that can provide a point of comparison for estimating the condition of the structure 22. For example, the reference data of the memory 254 or 266 may represent or include an image; a model; or any previously collected or generated data relating to the same structure or a similar structure. Further, either of data analysis modules 260 and 272 may use the estimate of the condition of the structure 22 to determine that the structure 22 is damaged, and then may calculate an estimated cost based on the extent of the damage to the structure 22.

The Laser Scanning Device 15 and Laser Tracking Device 13

Figure 3A:
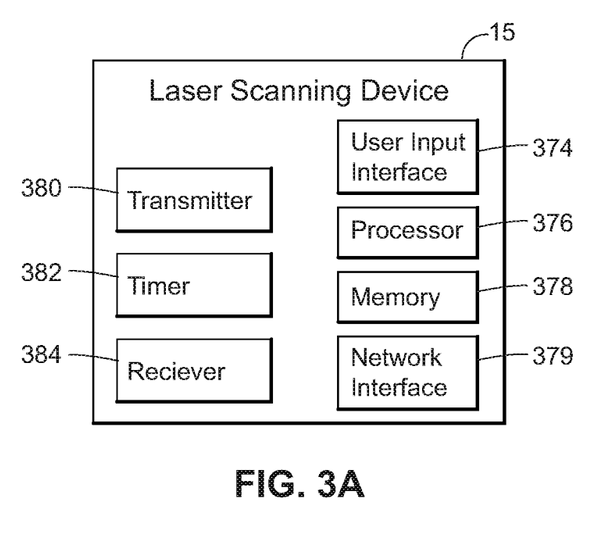
FIG. 3A is a block diagram of the laser scanning device of FIG. 2.

Referring now to FIG. 3A, a block diagram of the laser scanning device 15 (also shown in FIGS. 1 and 2) is depicted. The laser scanning device 15 scans the surface 24 of the structure 22, enabling the structure scanner 12 to generate a 3D model of the surface 24, which may be used to estimate the condition of the surface.

The laser scanning device 15 includes one or more of: a user input interface 374, a processor 376, a memory 378 coupled to the processor 376, and/or a network interface 379. The laser scanning device 15 may include a transmitter 380 for sending or transmitting laser pulses, a receiver 384 for receiving the reflected laser pulses, and a timer 382 for measuring the time of flight for the received pulses.

In one example, laser pulses are transmitted onto the surface 24 of the structure 22. These pulses may then reflect off the surface 24 and be received at the receiver 384. The time of flight of the reflected pulses received by the receiver 384 may be timed by the timer 382 (e.g., measured as a difference between a first time at which a pulse is transmitted by the transmitter 380 and a second time at which the pulse is received at the receiver 384), stored in the memory 378 of the laser scanning device 15, and accessed at a later time. In some instances, the time of flight of the reflected pulses received by the receiver 384 may be transmitted to the processor 252 of the structure scanner 12, which may calculate the distance from the laser scanning device 15 to one or more points on the surface 24 based on the speed of light and the time of flight for each reflected pulse received by the receiver 384. Such calculations may then be saved to the memory 254 of the structure scanner 12 and/or transmitted via the network interface 256 of the structure scanner 12 to the data analysis system 38 and displayed on the display 40 (FIG. 1), in one example, and as explained in more detail below.

Figure 3B:
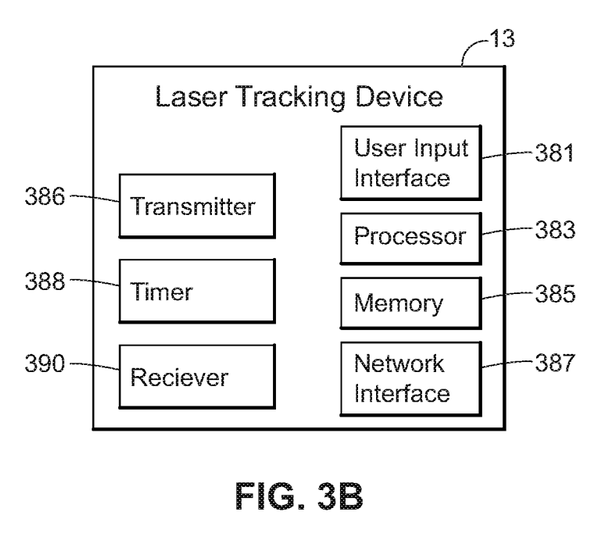
FIG. 3B is a block diagram of the laser tracking device of FIG. 2.

Referring now to FIG. 3B, a block diagram of the laser tracking device 13 (also shown in FIGS. 1 and 2) is depicted. The laser tracking device 13 tracks and scans the fiducial marker 28, which may enable the structure scanner 12 to determine a more accurate position and/or orientation for each of the scans of the surface 24 by the laser scanning device 15. By tracking the fiducial marker, the laser tracking device 13 improves the accuracy of the scans by reducing errors in position estimates that may compound over the course of the many scans needed to create a 3D model of the surface 24.

The laser tracking device 13 may include one or more of: a user input interface 381, a processor 383, memory 385, and/or a network interface 387. Further, the laser tracking device 13 includes a transmitter 386 for sending or transmitting laser pulses, a receiver 390 for receiving the reflected laser pulses, and/or a timer 388 for measuring the time-of-flight for the received pulses.

In one example, laser pulses are transmitted (e.g., via the transmitter 380 or 386) onto fiducial marker 28. These pulses may then reflect off the fiducial marker 28 and be received at the receiver 390. The time of flight of the reflected pulses received by the receiver 390 may be timed by the timer 388, stored in the memory 385 of the laser tracking device 13, and/or accessed at a later time. In some instances, the time of flight of the reflected pulses received by the receiver 390 may be transmitted to the processor 252 of the structure scanner 12, which may calculate the distance from the laser tracking device 13 to one or more points on the surface 24 using the speed of light and the time of flight for each reflected pulse received by the receiver 390. Such calculations may be saved to the memory 254 of the structure scanner 12 and/or transmitted over the network interface 256 of the structure scanner 12 to the data analysis system 38 and displayed on the display 40 (FIG. 1), in one example, and as explained in more detail below.

The Structure Scanner 12

Figure 4A:
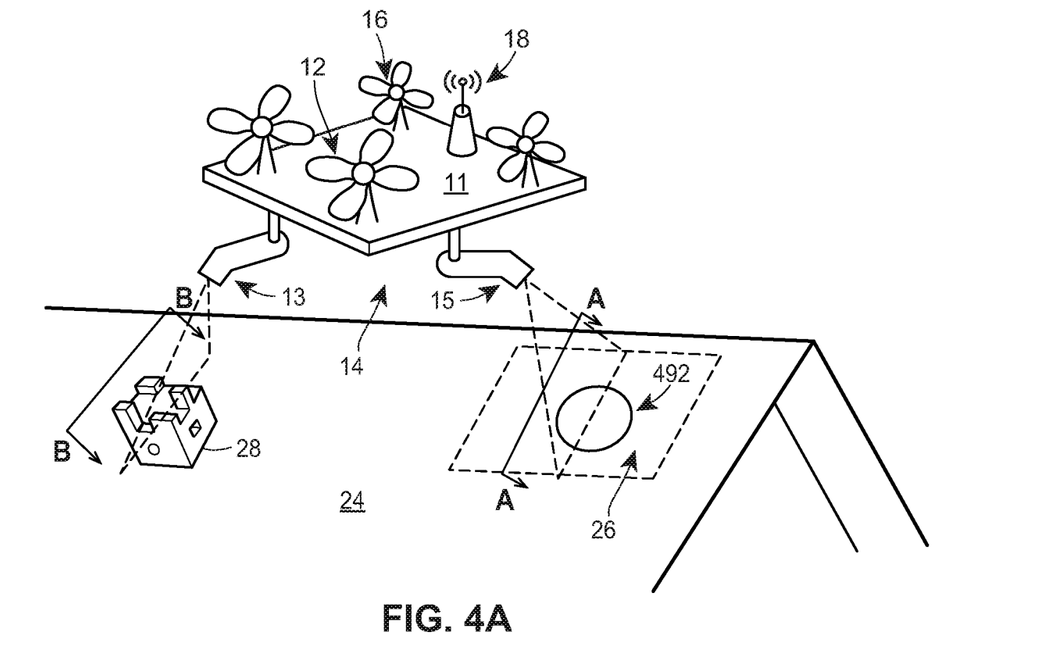
FIG. 4A is a perspective view of a structure scanner, a laser tracking device, a laser scanning device and a fiducial marker according to one aspect of the present disclosure.

FIG. 4A depicts the structure scanner 12 (also shown in FIG. 1) according to an embodiment. The structure scanner 12 may be utilized to generate a 3D model of the surface 24 of the structure 22 (also shown in FIG. 1). Advantageously, the structure scanner 12 may track the fiducial marker 28 to determine the spatial orientation and position of the structure scanner 12 relative to the surface 24, enabling the structure scanner 12 to scan multiple sections of the surface 24 over time while correcting for changes in position and orientation over time. By correcting for changes in position and orientation over time, the structure scanner 12 can accurately map the scans of the multiple sections to a 3D model of the surface 24. Without correcting for changes in position and orientation, inaccuracies in position estimates over the many scans of the surface 24 could result in a 3D model that looks nothing like the surface 24.

Note, FIG. 4A depicts an example representation of the fiducial marker 28, but the fiducial marker 28 may take different forms in other embodiments. For example, while the fiducial marker 28 is depicted as a 3D design, in some instances it may be a two-dimensional (2D) design (e.g., a picture or QR code) placed on the surface 24.

Also depicted on the surface 24 is a surface defect 492 and the scanning area 26 (also shown in FIG. 1). The surface defect 492 is depicted as a divot in the roof, but may be any sort of imperfection of the surface, such as a broken roof tile or moisture damage.

As further shown in FIG. 4A, the laser tracking device 13 is engaged in a scan on the fiducial marker 28. Similarly, the laser scanning device 15 is engaged in a scan of the scanning area 26. In one example operation, the laser tracking device 13 may scan the fiducial marker 28 in order to determine the relative position and orientation of the scanning system 112. The relative position orientation of the property scanner 12 may be determined by identifying a unique feature in the scan of the fiducial marker 28 and comparing the scan of the unique feature to a reference scan of the unique feature in the known position and orientation. For example, the reference scan may be from directly above the fiducial at a height of 10 feet. The laser tracking device 13 may scan the fiducial marker 28 only at the beginning of a scan of the surface, or it may continuously scan the fiducial marker 28 in order to update measurements of the relative position and orientation of the structure scanner 12. Once the relative position and orientation of the scanner 12 is known, the laser scanning device 15 may scan the scanning area 26. The scanning area 26 may be on the surface of a structure, such as a roof, and may also further contain one or more surface defects, such as the surface defect 492. Additionally, or alternatively, the laser scanning device 15 may scan the scanning area 26 while the laser tracking device 13 scans the fiducial marker 28. The scan from the laser scanning device 15 may then be adjusted based on the determined relative position and orientation of the structure scanner 12.

Figure 4B:
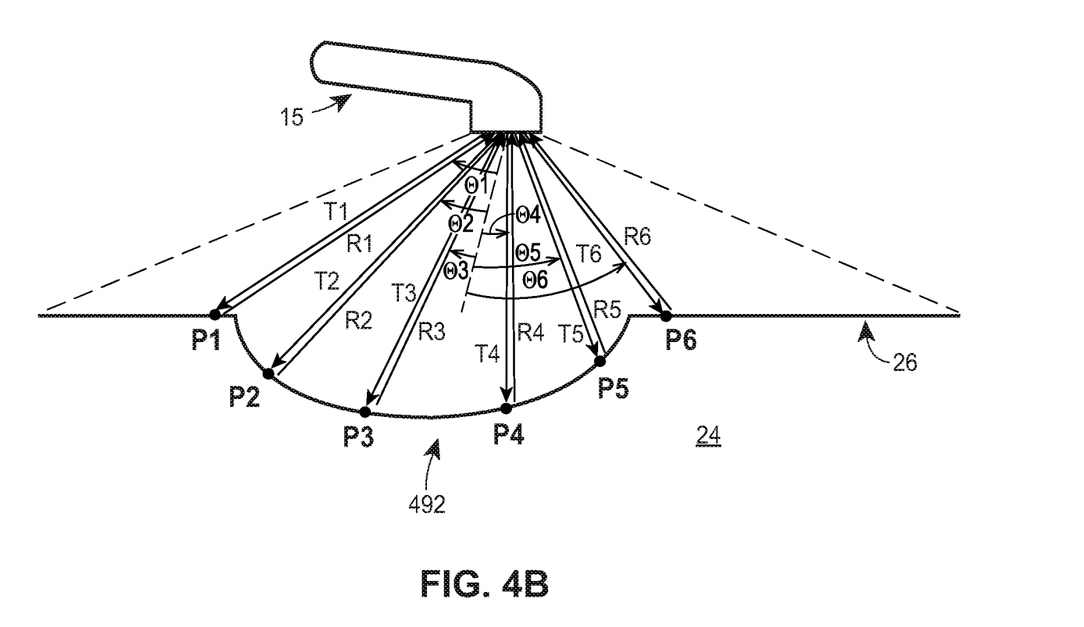
FIG. 4B is a cross-sectional view of the laser scanning device and scanning area of FIG. 4A, taken along line A-A of FIG. 4A.

Referring now to FIG. 4B, a cross-sectional view of the laser scanning device 15, engaged in a scan of the scanning area 26 and surface defect 129, taken along line A-A of FIG. 4A is depicted. As depicted, the laser scanning device 15 is a point laser scanner implemented as a line scanner. The laser scanning device 15 measures the distance to several points P1, P2, P3, P4, P5, P6 on the surface 26. For each point P1-P6, the laser scanning device 15 transmits a laser pulse T1, T2, T3, T4, T5, T6 and measures (with a timer, such as the timer 382 in FIG. 3A) the time of flight $t_1$, $t_2$, $t_3$, $t_4$, $t_5$, $t_6$ (not depicted) it takes for the reflected laser pulse R1, R2, R3, R4, R5, R6 to return to the receiver, such as the receiver 384 in FIG. 3A. Once the times of flight $t_1$-$t_6$ for each of the points on the surface P1-P6 are known, the laser scanning device 15 can calculate the distance to each of the points $d_1$, $d_2$, $d_3$, $d_4$, $d_5$, $d_6$ (not depicted) by multiplying the speed of light by half of the time of flight $$\left(\text{i.e., } d_i = c * \frac{t_i}{2}\right).$$

Further, in order to transmit the transmitted laser pulses T1-T6 toward the different points P1-P6, the transmitter of the laser scanning device 15 must rotate. Therefore, each of T1-T6 has a corresponding transmission angle $\theta_1$, $\theta_2$, $\theta_3$, $\theta_4$, $\theta_5$, $\theta_6$. As one skilled in the art will appreciate, the location of each of the points P1-P6 can be determined relative to the laser scanning device 15 by combining the transmission angles $\theta_1$-$\theta_6$ and the measured distances $d_1$-$d_6$.

In example operation, the laser scanning device 15 effects a scan on the scanning area 26 of a surface 24 of a structure, such as the structure 22 of FIG. 1. As described above, the laser scanning device 15 may scan one or more points of a plurality of points within the scanning area 26. This may involve collecting a distance and transmission angle for each of the points, such as the distances d1-d6 and transmission angles $\theta_1$-$\theta_6$. Once collected, a 3D representation of the scanning area 26 may be generated based on the collected distances and transmission angles. This may be done either by the processor 376 of the laser scanning device 15, by the processor 252 in the structure scanner 12 or by the processor 264 in the data analysis system (such as the data analysis system 38 of FIGS. 1 and 2). Once the 3D representation is generated, the data analysis system 38 may generate an estimate of the condition of the structure 22 based on the generated 3D representations. This determination may be based on any identified surface features, such as the surface defect 492, or any other identified issues with the surface of the structure.

Figure 4C:
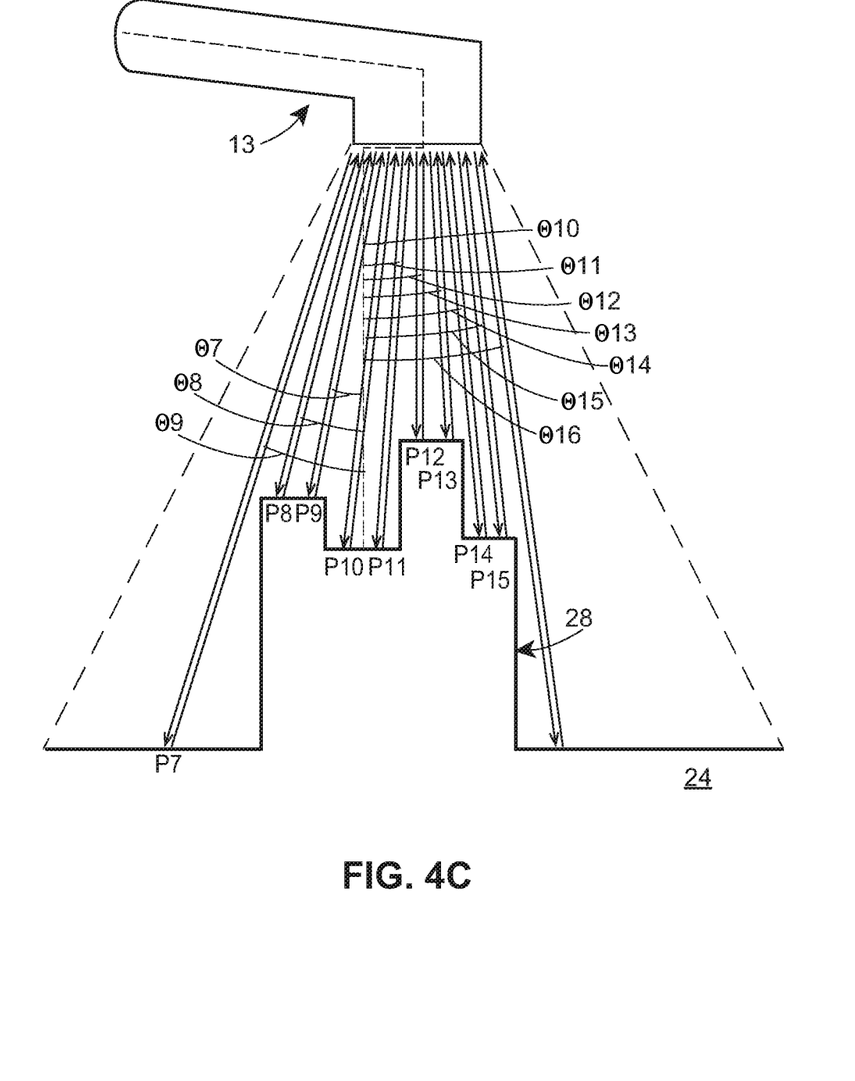
FIG. 4C is a cross-sectional view of the laser tracking device and fiducial marker of FIG. 4A, taken along line B-B of FIG. 4A.

Referring now to FIG. 4C, a cross-sectional view of the laser tracking device 13, engaged in a scan of the fiducial marker 28, taken along line B-B of FIG. 4A is depicted. The laser tracking device 13 may scan the fiducial marker 28 in order to generate an estimate of the structure scanner 12's position and/or orientation. The laser tracking device 13 may identify one or more unique features in the scan of the fiducial marker 28. The laser tracking device 13 may then compare unique features in the scan of the fiducial marker 28 to the unique features in a reference scan of the fiducial marker 28 from a known position and orientation. By determining the difference in the position and orientation of the one or more unique features of the fiducial marker 28 in the scan and reference scan, the laser tracking device 13 may then determine an accurate estimate of the position and/or orientation of the structure scanner 12. The accurate position and/or orientation estimate enables the structure scanner 12 to more accurately assemble multiple scans of the surface 24 into an accurate 3D model.

As depicted, the laser tracking device 13 is a point laser scanner implemented as a line scanner. The laser tracking device 13 measures the distance to several points P7, P8, P9, P10, P11, P12, P13, P14, P15 and P16 on the surface 24 and the fiducial marker 28. Similar to above, for each point P7-P16, the laser tracking device 13 transmits a laser pulse T7, T8, T9, T10, T11, T12, T13, T14, T15, T16 and measures (with a timer, such as the timer 388 in FIG. 3B) the time of flight $t_7, t_8, t_9, t_{10}, t_{11}, t_{12}, t_{13}, t_{14}, t_{15}, t_{16}$ for the reflected laser pulse R7, R8, R9, R10, R11, R12, R13, R14, R15, R16 to return to the receiver, such as the receiver 390 of FIG. 3B. Once the times of flight $t_7$-$t_{16}$ are known, the laser tracking device 13 can calculate the distance to each of the points $d_7, d_8, d_9, d_{10}, d_{11}, d_{12}, d_{13}, d_{14}, d_{15}, d_{16}$ (not depicted) to each of the points P7-P16 by multiplying the speed of light by the half of the time of flight $$\left(\text{i.e., } d_i = c * \frac{t_i}{2}\right).$$

Further, in order to transmit the transmitted laser pulses T7-T16, the transmitter of the laser tracking device 13 must rotate. Accordingly, each of T7-T16 has a known transmission angle $\theta 7, \theta 8, \theta 9, \theta 10, \theta 11, \theta 12, \theta 13, \theta 14, \theta 15, \theta 16$. As one skilled in the art will appreciate, the location of each of the points P7-P16 can be determined relative to the laser tracking device 13 by combining the transmission angles $\theta 7$-$\theta 16$ and the measured distances $d_7$-$d_{16}$.

In example operation, the laser tracking device 13 effects a scan on the fiducial marker 28 on the surface 24. The laser tracking device 13 may scan one or more points of a plurality of points on the fiducial marker 28. This may involve collecting a distance and transmission angle for each of the points, such as the distances d7-d16 and transmission angles $\theta 7$-$\theta 16$. Once collected, a 3D representation of the fiducial marker 28 may be generated based on the collective distances and transmission angles. This may be done either by the processor 383 of the laser tracking system 18; by the processor 252 of the structure scanner 12; and/or by the processor 264 of the data analysis system 38. Once the 3D representation of the fiducial marker 28 is generated, the data analysis system 38 may determine the orientation and position of the structure scanner 12 relative to the fiducial marker 28 based on the 3D data points. The data analysis system 38 may then use the determined orientation and position of the structure scanner 12 to adjust the measurements of the laser scanning system 13. For example, the data analysis system 38 may determine that the structure scanner 12 has shifted away from the structure by one foot relative to the previous scan. Therefore, in order to maintain continuity between consecutive scans, the data analysis system 38 may adjust the generated 3D data points generated after the structure scanner 12 has moved to be one foot closer to the structure scanner 12. In this way, the results from a sequence of scans can be combined in order to form a more continuous and complete collection of 3D data points for the structure 24.

Additionally, the determined orientation and position of the structure scanner 12 may be used to maintain the stability of the flying device 16 and the structure scanner 12 during a scan. To accomplish this, the flying device 16 may adjust one or more of the position, orientation and trajectory of the structure scanner 12 based on the determined orientation and position. For example, if the data analysis system 38 determines that the structure scanner 12 has moved laterally by a few inches in between scans, it may command the structure scanner 12 to engage the flying device 16 in order to counteract these movements. For example, if the data analysis system 38 determines that the structure scanner 12 has moved left by six inches, it may command the structure scanner 12 to engage the flying device 16 and move the structure scanner 12 right by six inches. Additionally, if the data analysis system 38 determines that the structure scanner 12 has rotated counterclockwise by 10°, it may command the structure scanner 12 to engage the flying device 16 and rotate the structure scanner 12 clockwise by 10°. In this way, the stability of the structure scanner 12 is improved, which increases the accuracy of combining consecutive scans into one comprehensive scan of the surface 24 of the structure 22.

The Fiducial Marker 28

Figure 5A:
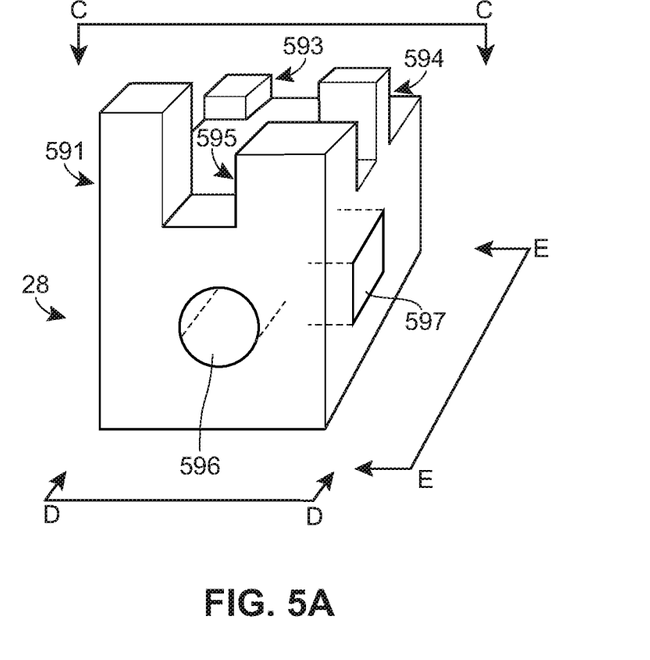
FIG. 5A is a perspective view of a 3D fiducial marker according to one aspect of the present disclosure.

Referring now to FIG. 5A, an example of the fiducial marker 28 is depicted. As noted, the laser tracking device 13 may scan the fiducial marker 28 to determine the position and orientation of the structure scanner 12.

The fiducial marker 28 may contain a plurality of unique features, such as the unique features 591, 593, 594, 595, 596 and 597. The laser tracking device 13 compares the position and/or orientation of the unique features in a scan of the fiducial marker 28 to their position in a reference scan of the fiducial marker 28. The structure scanner 12 relies results of the comparison (e.g., revealing a difference in position and/or orientation) to determine a position of the structure scanner 12. Generally speaking, the more unique features the fiducial marker 28 has, the better the laser tracking device 13 and the structure scanner 12 can estimate a position and/or orientation. By improving the position estimates, the laser tracking device 13 and the fiducial marker 28 improve the accuracy of the final 3D model of the surface 24 to ensure that the multiple scans of the surface 24 can be assembled together correctly.

As depicted, the fiducial marker 28 is roughly cube-shaped, with unique protrusions 591, 593, 594 and 595 and unique channels 596 and 597. Although the fiducial marker 28 is depicted as cube-shaped and 3D, the fiducial marker 28 may in fact be any shape that provides enough unique features to allow accurate estimations of the relative location and orientation of the structure scanner 12. Depending on accuracy needs, the fiducial marker 28 may be two-dimensional (2D) in some instances, and may include a unique pattern such as a QR code.

Figure 5B:
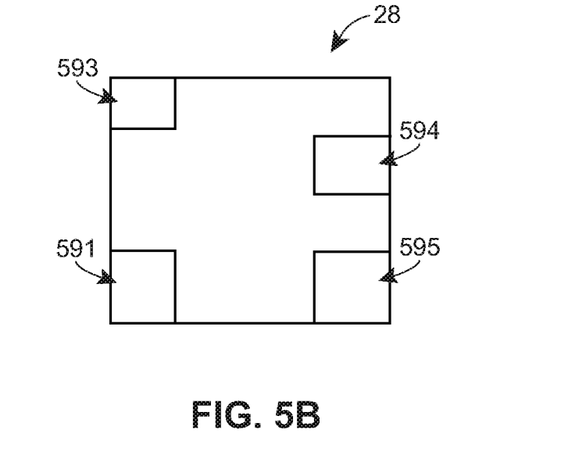
FIG. 5B is a perspective view of the 3D fiducial marker of FIG. 5A viewed from line C-C of FIG. 5A.
Figure 5C:
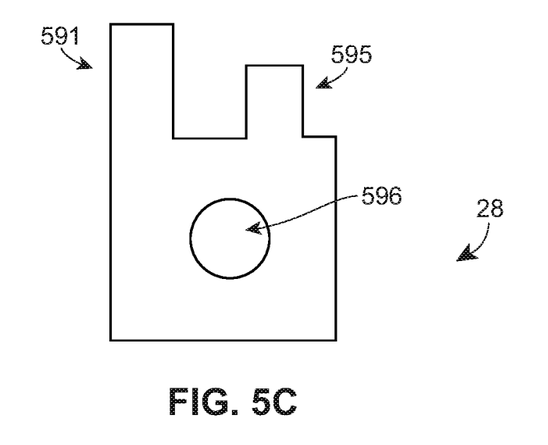
FIG. 5C is a perspective view of the 3D fiducial marker of FIG. 5A viewed from line D-D of FIG. 5A.
Figure 5D:
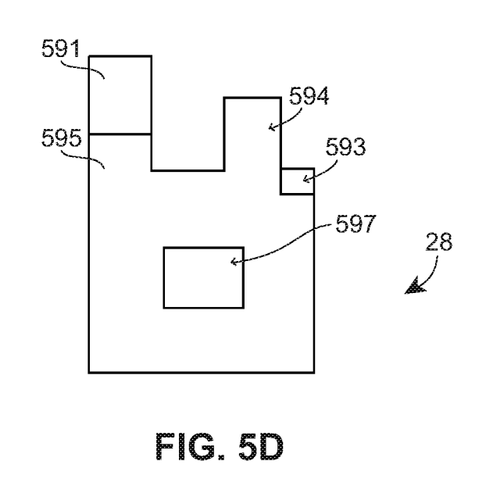
FIG. 5D is a perspective view of the 3D fiducial marker of FIG. 5A viewed from line E-E of FIG. 5A.

The appearance of the fiducial marker 28 in the scan may differ, depending on the position of the structure scanner 12 relative to the fiducial marker 28 at the time of the scan. For example, as depicted in FIG. 5B, if the structure scanner 12 is directly above the fiducial marker 28, the unique features 591, 593, 594 and 595 will all appear head on. Similarly, as depicted in FIG. 5C, if the scanner is directly in front of the fiducial marker 28, unique features 591, 595 and 596 appear head on, with unique feature 593 obstructed by unique feature 591. Likewise, as FIG. 5D depicts, if the structure scanner 12, 112 is directly to the right of the fiducial marker 28, unique features 591, 593, 594, 595 and 597 appear head on.

In example operation, after the structure scanner 12 completes a scan of the fiducial marker 28, the data analysis system 38 may analyze the generated 3D data points and identify at least one unique feature of the fiducial marker 28. For instance, if the structure scanner 12 is located to the right of the fiducial marker 28, the data analysis system 38 may identify unique features 591, 593, 594, 595, and 597. The data analysis system 38 may then locate the same one or more unique features in a reference plurality of 3D data points that correspond to a depiction of the fiducial from a known distance and orientation. This reference scan may be generated by scanning the fiducial marker 28 prior to effecting a scan of the surface 24 of the structure 22. The data analysis system 38 may then calculate a difference between the scan of the unique features in the scan of the fiducial marker 28 and the scan of the unique features in the reference scan of the fiducial marker 28. For example, as depicted in FIG. 5D, if the data analysis system 38 determines that unique feature 595 is in front of the unique feature 591 and the unique feature 593 is behind and to the right of 594, it may determine that the structure scanner 12 is to the right of the fiducial marker 28. In this way, the data analysis system 38 may thus determine the position and/or orientation of the structure scanner 12 relative to the fiducial marker 28.

An Example Method 600 for Inspecting a Condition of a Surface

Figure 6:
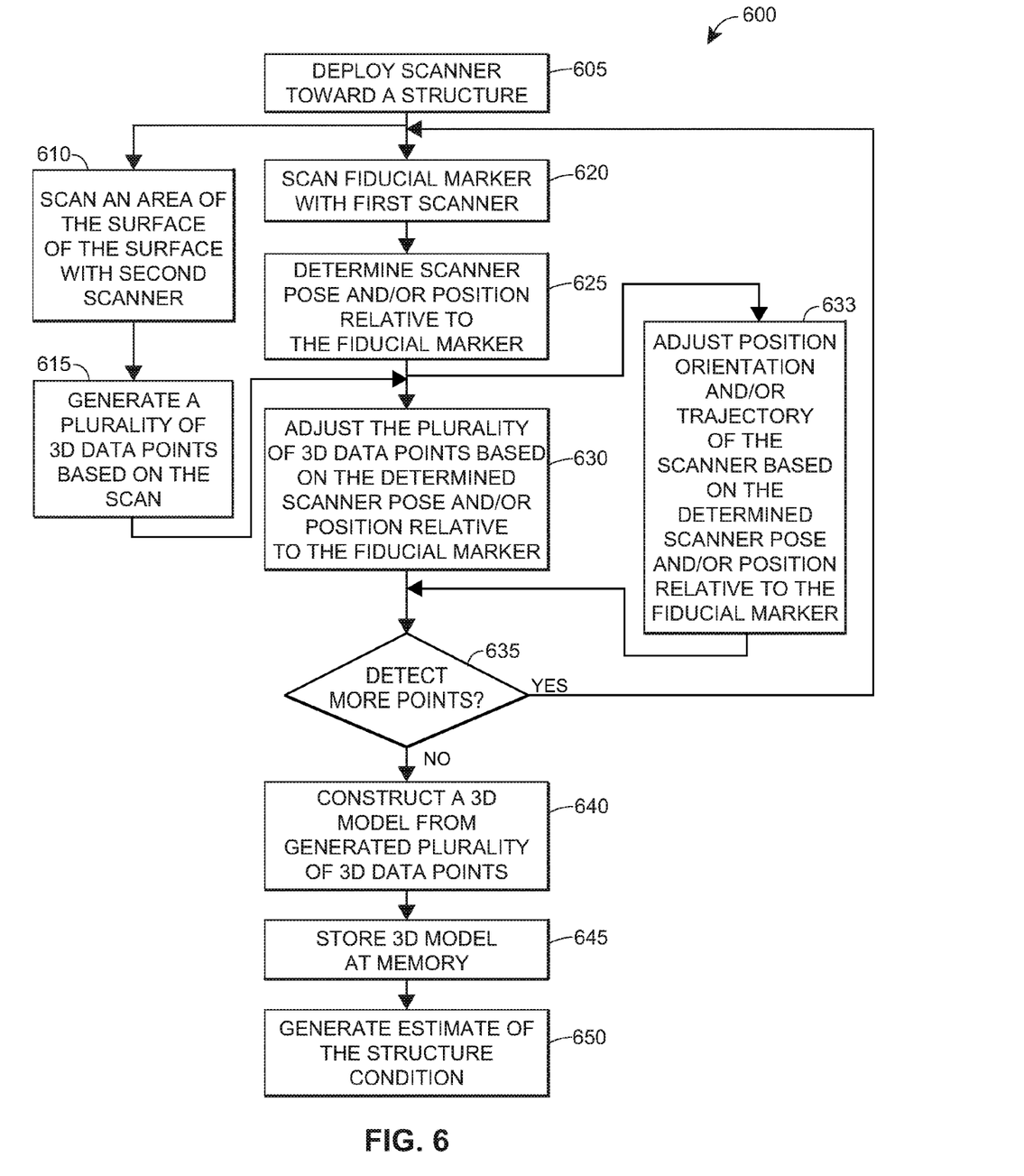
FIG. 6 is an exemplary flow chart depicting a method of one aspect of the present disclosure.

FIG. 6 is a flowchart of an example method 600 for inspecting the condition of the surface 24 of the structure 22 shown in FIG. 1. The method 600 may be implemented, in whole or in part, on one or more devices or systems such as those shown in the property inspection system 10 of FIGS. 1 and 2. The method may be saved as a set of instructions, routines, programs or modules on memory such as the memory 254 or the memory 266, and may be executed by a processor such as the processor 252 or the processor 264 shown in FIG. 2.

The method 600 begins when the structure scanner 12 is deployed toward a structure, such as the structure 22 shown in FIG. 1. As noted, the structure 22 may be any kind of building or structure, such as a single-family home, townhome, condominium, apartment, storefront, or retail space. The structure 22 may also be any of the structure types discussed regarding FIG. 1, such as a vehicle, boat, or aircraft. In such structures, the structure scanner 12 may be used to inspect body panels, windows, frames and other surfaces associated with the vehicle, boat or aircraft.

After deployment, the laser tracking device 13 scans the fiducial marker 28 (block 620). Said another way, the laser tracking system 13 scans one or more points P7-P16 of a plurality of points of the fiducial marker 28. As noted, the laser tracking system 13 may be implemented as a laser line scanner or any other scanner capable of transmitting, timing and receiving laser pulses. As discussed above in reference to FIG. 4C, the laser tracking system 13 may scan the one or more points of a plurality of points of the fiducial marker 28 by transmitting one or more laser pulses T7-T16 towards the one or more points P7-P16 and measuring the time it takes $t7$-$t16$ for the transmitted pulse/s T7-T16 to reflect off of the one or more points of the fiducial marker and be detected at the receiver R7-R16, such as the receiver 390 in FIG. 3B. These pulses may also be transmitted and received sequentially in a line, with a measured transmission angle θ7-θ16, in order to enable the laser tracking device 13 to scan along the line. As further discussed above in reference to FIG. 5A, the fiducial marker 28 may be either 2D or 3D in nature.

Next, a pose and/or position of the structure scanner 12 relative to the fiducial marker 28 may be determined (block 625). While this determination is generally described below as being performed by the processor 264 of the data analysis system 38, it will be understood that the determination may be performed by the processor 252 of the structure 112 and/or by the processor 264 of the data analysis system 38. To make the determination, the data analysis system 38 may generate a 3D representation of the fiducial marker 28 based on the scan and may compare the 3D representation of the fiducial marker 28 to a reference 3D representation of the fiducial marker 28. The data analysis system 38 may identify (e.g., from the scan of points P7-P16 described with reference to FIG. 4C) at least one unique feature of the fiducial marker 28 (such as one of the unique features 591, 593, 594, 595, 596, 597 shown in FIGS. 5A-5C). The data analysis system 38 may further locate the at least one unique feature of the fiducial marker 28 in the reference scan of the fiducial marker 28. The data analysis system 38 may then calculate a difference between the scan of the at least one unique feature and the reference scan of the at least one unique feature. The data analysis system 38 may then use this calculated difference to determine the position and/or orientation of the structure scanner 12 relative to the fiducial marker 28.

Next, the structure scanner 12 scans an area of the surface 24 using the laser scanning device 15 (block 610) and generates a plurality of 3D data points based on the scan (block 615). Said another way, the laser scanning device 15 scans one or more points of a plurality of points of the structure 22 and generates 3D representations of those points (see also FIGS. 4A and 4B). As noted, the laser scanning device 15 may be implemented as a laser line scanner or any other scanner capable of transmitting, timing and receiving laser pulses. As discussed above in reference to FIG. 4B, the laser scanning system 15 may scan the one or more points of a plurality of points P1-P6 of the surface 24 by transmitting one or more laser pulses T1-T6 towards the one or more points P1-P6 of the surface 24 of the structure 22 and measuring the time $t_1$-$t_6$ it takes for the transmitted pulse to reflect off of the one or more points of the surface of the structure and to be detected at the receiver 384 (shown in FIG. 3A) of the laser scanning device 15. The pulses may also be transmitted and received sequentially in a line, with a measured transmission angle θ1-θ6, in order to enable the laser scanning device 15 to scan along the line.

Blocks 610 and 615 may occur either simultaneously with blocks 620 and 625, or may occur before or after. For example, the laser tracking device 13 scan the fiducial marker 28 at the same time the laser scanning device 15 scans the surface 24 of the structure 22. Similarly, the data analysis system 38 may generate the plurality of 3D data points based on the scan described with reference to block 615 at the same time it determines the pose and/or position of the structure scanner 12 relative to the fiducial marker 28. As another example, the laser tracking device 13 may scan the fiducial marker 28 and the data analysis system 38 may determine the pose and/or position of the structure scanner 12 relative to the fiducial marker 28 before the laser scanning device 15 scans the area 26 of the surface 24 and before the data analysis system 38 generates a plurality of 3D data points based on the scan of the surface 24 of the structure 22.

After all of blocks 610, 615, 620 and 625 are complete, the data analysis system 38 adjusts the plurality of 3D data points from the scan of the area 26 (i.e., the 3D data points generated at block 615) based on the determined pose and/or position of the structure scanner 12 relative to the fiducial marker 28 (block 630). In some instances, it may be beneficial to relocate the structure scanner 12 during a scan. Further, sometimes the structure scanner 12 moves when it should not move (e.g., due to natural forces like wind). To aid in reconstituting the individual scans from each location into one comprehensive scan of the structure when the structure scanner 12 moves, it is helpful to know the relative location of the structure scanner 12 for each individual scan. To accomplish this, a 3D representation of the scanned area may be mapped based on the determined orientation and position of the structure scanner 12. For example, if the relative orientation changes between scans of the fiducial marker 28 and indicates that the structure scanner 12 moved up by one foot, then the data analysis system 38 may adjust the plurality of 3D data points up by one foot in order to compensate for the movement between scans. Similarly, if the relative orientation of the structure scanner 12 changes between scans of the fiducial marker 28 and indicates that the structure scanner has rotated by 10 degrees clockwise, the data analysis system 38 may map 3D representation by rotating the scanned points counterclockwise by 10 degrees in order to compensate for the movement between scans.

Additionally, or alternatively, once all of blocks 610, 615, 620 and 625 are complete, at block 633, the data analysis system 38 adjusts the position and/or orientation of the structure scanner 12 based on the determined structure scanner pose and/or position relative to the fiducial marker 28 from block 620. For example, if the relative orientation changes between scans of the fiducial marker 28 and indicates that the structure scanner 12 moved up by one foot, then the property inspection system may send a command to the flying device 16 of the structure scanner 12 to move down by one foot in order to compensate for the movement between the scans. Similarly, if the relative orientation of the structure scanner 12 changes between scans of the fiducial marker 28 and indicates that the structure scanner 12 has rotated by 10 degrees clockwise, the property inspection system 10 may send a command to the flying device 16 of the structure scanner 12 to rotate counterclockwise by 10 degrees in order to compensate for the movement between scans.

In some instances, the data analysis system 38 may adjust the position, orientation, and/or position of the structure scanner 12 based on a change in position and/or orientation determined via additional and/or alternative means. For example, in addition to and/or in place of utilizing the laser tracking device 13 and fiducial marker 28, the structure scanner 12 may include one or more of the following sensors, which it may utilize to detect a change in position and/or orientation: an accelerometer, a gyro, a GPS receiver, and a compass. These sensors may generate orientation data (e.g., indicating a direction, within a 3D environment, that the structure scanner 12 is directed) and/or position data. This generated orientation and/or position data may be useful, for example, when the structure scanner 12 obtains one or more deficient scans of the fiducial marker 12 (e.g., due to the structure scanner 12 moving while scanning the fiducial marker 28). In some instances, the structure scanner 12 may include a camera it utilizes to capture images of surroundings and/or of the structure to be scanned. The structure scanner 12 may capture multiple images (e.g., from a wide angle view) and compare features within the multiple images over time to determine the structure scanner 12 has changed position and/or orientation. This determined change in position and/or orientation can be utilized in addition to, or in place of, the laser-based technique described herein for determining change in position and/or orientation.

At block 635, at least one processor, such as the processor 252 of the structure scanner or the processor 264 of the data analysis system, determines whether enough points of the plurality of points of the surface of the structure have been detected or whether more points need to be detected. If enough points have been detected, a processor, such as the processor 264 of the data analysis system 38 constructs a 3D model from the generated plurality of 3D data points (block 640). Next, the processor 264 of the data analysis system may cause the 3D model to be stored at the memory 266 of the data analysis system 38 of the property inspection system 10 (block 645). At block 650, the processor 264 communicatively connected to a memory 266 of the data analysis 38 generates an estimate or an estimation of the condition of the surface 24 of the structure 22 based on one or more 3D representations of the surface of the structure.

If, however, at block 635, the processor 264 determines that more points need to be detected, the structure scanner 12 detects more 3D information by scanning the fiducial marker 28 (block 620) and/or an area of the surface 24 of the structure 22 (block 610). The process of blocks 610, 615, 620, 625 and/or 630 will continue until it is determined at block 635 that enough points have been detected. The process of blocks 640, 645 and 650, as described above, then continue to ultimately construct a 3D model from the generated plurality of 3D data points, store that model at the memory 266 of the data analysis system 38, for example, and generate an estimate of the condition of the surface 24 of the structure 22 based on the plurality of 3D data points, respectively.

Additional Considerations

The following additional considerations apply to the foregoing discussion throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Discussions herein referring to an "appraiser," "inspector," "adjuster," "claim representative" or the like are non-limiting. One skilled in the art will appreciate that any user associated with an insurance company or an insurance function may utilize one or more of the devices, systems, and methods disclosed in the foregoing description. One skilled in the art will further realize that any reference to a specific job title or role does not limit the disclosed devices, systems, or methods, or the type of user of said devices, systems, or methods.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA) / field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and to the extent conventional computers are involved, improve the functioning of conventional computers.

We claim:

1. A property inspection system for scanning a structure with one or more structure scanners, the property inspection system comprising:
   a three-dimensional fiducial marker with a known size and shape having unique 3D surface features at a known location on the surface of the structure; and
   a structure scanner mounted to a flying device, the structure scanner comprising:
   (i) a laser tracking device configured to obtain a scan of the unique 3D surface features of the three-dimensional fiducial marker;
   (ii) a laser scanning device configured to scan a portion of the surface of the structure to obtain a 3D representation of the portion of the surface; and
   (iii) one or more processors configured to:
      (a) analyze the scan of the three-dimensional fiducial marker to generate an estimate of an orientation and position of the structure scanner based on the scan of the unique 3D surface features of the three-dimensional fiducial marker;
      (b) use the estimated orientation and position of the structure scanner to estimate a real-world position of the portion of the surface represented by the 3D representation; and
      (c) map the 3D representation of the portion of the surface of the structure to a 3D model of the structure based, at least in part, on the estimated real-world position of the portion of the surface; and (d) generate an estimate of a condition of the structure based on the 3D model of the structure.

2. The property inspection system of claim 1, wherein the structure scanner is configured to be in flight while the laser tracking device scans the portion of the surface.

3. The property inspection system of claim 1, wherein the structure scanner is configured to be held by a user while the laser tracking device scans the portion of the surface.

4. The property inspection system of claim 1, wherein the scan is a first scan and wherein the one or more processors are further configured to estimate a second orientation and position of the structure scanner based on a second scan of the unique 3D surface features of the three-dimensional fiducial marker after the structure scanner has moved from a first position at which the first scan was obtained to a second position at which the second scan was obtained.

5. The property inspection system of claim 1, wherein the one or more processors are further configured to maintain a stable orientation and position of the structure scanner while the laser scanner device is in operation based on the estimated orientation and position of the structure scanner.

6. The property inspection system of claim 1, wherein the scan is a first scan and wherein the one or more processors are configured to analyze the first scan of the unique 3D surface features of the three-dimensional fiducial marker to generate the estimate of the orientation and position by: comparing the first scan of the unique 3D surface features of the three-dimensional fiducial marker to a reference scan of the unique 3D surface features of the three-dimensional fiducial marker that was taken from a known distance and orientation relative to the unique 3D surface features of the three-dimensional fiducial marker.

7. The property inspection system of claim 6, wherein the one or more processors are configured to compare the first scan to the reference scan by: comparing a first set of unique 3D surface features of the three-dimensional fiducial marker included in the first scan to a second set of unique 3D surface features of the three-dimensional fiducial marker in the reference scan.

8. The property inspection system of claim 7, wherein the one or more processors are configured to compare the first and second sets of unique 3D surface features of the three-dimensional fiducial marker in the first scan and the reference scan by: calculating a difference in size or orientation of at least one unique 3D surface feature included in both the first and second sets of unique-3D surface features.

9. A method for scanning a structure with one or more structure scanners, the method comprising:

deploying a three-dimensional fiducial marker having unique 3D surface features on a structure;

scanning, via a structure scanner mounted to a flying device, the three-dimensional fiducial marker having unique 3D surface features with a laser tracking device of the structure scanner to obtain a scan of the unique 3D surface features of the three-dimensional fiducial marker and to estimate an orientation and position of the structure scanner based on the scan of the unique 3D surface features of the three-dimensional fiducial marker;

scanning a portion of the surface of the structure with a laser scanning system of the structure scanner to obtain a 3D representation of the portion of the surface;

using the estimated orientation and position of the structure scanner to estimate a real-world position of the portion of the surface represented by the 3D representation;

mapping the 3D representation of the portion of the surface of the structure to a 3D model of the structure based, at least in part, on the estimated real-world position of the portion of the surface; and generating an estimation of a condition of the structure based on the 3D model of the structure.

10. The method of claim 9, wherein scanning the three-dimensional fiducial marker with the laser tracking device comprises scanning the three-dimensional fiducial marker while the structure scanner is in flight.

11. The method of claim 9, wherein scanning the three-dimensional fiducial marker with the laser tracking device comprises scanning the three-dimensional fiducial marker while the structure scanner is not in flight.

12. The method of claim 9, wherein the scan is a first scan;

wherein the method further includes: estimating a second orientation and position of the structure scanner based on a second scan of the unique 3D surface features of the three-dimensional fiducial marker after the structure scanner has moved from a first position at which the first scan was obtained to a second position at which the second scan was obtained; and using the second orientation and position of the structure scanner to estimate a second real-world position of a second portion of the surface represented by a second 3D representation obtained via the second scan.

13. The method of claim 9, further comprising maintaining a stable orientation and position of the structure scanner while the laser scanning device is in operation based on the estimated orientation and position of the structure scanner.

14. The method of claim 9, wherein the scan is a first scan;

wherein scanning the unique 3D surface features of the three-dimensional fiducial marker with a laser tracking device of the structure scanner to obtain the first scan of the unique 3D surface features of the three-dimensional fiducial marker and to estimate the orientation and position of the structure scanner based on the first scan of unique 3D surface features of the three-dimensional fiducial marker comprises:

analyzing the first scan of the unique 3D surface features of the three-dimensional fiducial marker to generate the estimate of the orientation and position by comparing the first scan of the unique 3D surface features of the three-dimensional fiducial marker to a reference scan of the unique 2D surface features of the three-dimensional fiducial marker that was taken from a known distance and orientation relative to the unique 3D surface features of the three-dimensional fiducial marker.

15. The method of claim 14, wherein comparing the first scan to the reference scan comprises:

comparing a first set of unique 3D surface features of the three-dimensional fiducial marker included in the first scan to a second set of unique 3D surface features of the three-dimensional fiducial marker in the reference scan.

16. The method of claim 15, wherein comparing the first set of unique 3D surface features to the second set of unique 3D surface features comprises:

calculating a difference in size or orientation of at least one unique 3D surface feature included in both the first and second sets of unique 3D surface features.

* * * * *